(12) United States Patent
Yoshikata et al.

(10) Patent No.: US 8,741,499 B2
(45) Date of Patent: Jun. 3, 2014

(54) SOLID OXIDE FUEL CELL

(75) Inventors: Kuniaki Yoshikata, Tokyo (JP); Koichi Mikami, Tokyo (JP); Hirotoshi Sakamoto, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 833 days.

(21) Appl. No.: 12/926,400

(22) Filed: Nov. 16, 2010

(65) Prior Publication Data

US 2011/0065015 A1 Mar. 17, 2011

Related U.S. Application Data

(63) Continuation of application No. 10/561,789, filed as application No. PCT/JP2004/009347 on Jun. 25, 2004, now Pat. No. 8,101,316.

(30) Foreign Application Priority Data

| Jun. 26, 2003 | (JP) | 2003-182618 |
| Jul. 4, 2003 | (JP) | 2003-271191 |
| Jul. 23, 2003 | (JP) | 2003-278485 |
| Mar. 12, 2004 | (JP) | 2004-71596 |

(51) Int. Cl.
*H01M 8/24* (2006.01)

(52) U.S. Cl.
USPC ............ 429/465; 429/471; 429/479; 429/495

(58) Field of Classification Search
USPC ................... 429/465, 471, 479, 495
See application file for complete search history.

(56) References Cited

U.S. PATENT DOCUMENTS

| 4,248,941 A | 2/1981 | Louis et al. ............... 429/13 |
| 5,372,895 A | 12/1994 | Sato et al. ............... 429/30 |
| 5,786,105 A * | 7/1998 | Matsushima et al. ......... 429/465 |
| 7,081,317 B2 * | 7/2006 | Fujii et al. ............. 429/465 |
| 7,517,601 B2 * | 4/2009 | Yoshikata et al. ........... 429/465 |
| 8,101,316 B2 * | 1/2012 | Yoshikata et al. ........... 429/495 |
| 8,252,479 B2 * | 8/2012 | Yoshikata et al. ........... 429/479 |

FOREIGN PATENT DOCUMENTS

| CN | 1226090 A | 8/1999 |
| EP | 0 480 116 A1 | 4/1992 |
| EP | 0 959 348 | 11/1999 |
| EP | 1 294 039 A1 | 3/2003 |
| JP | 8-264195 | 10/1996 |
| JP | 2780885 | 7/1998 |
| JP | 10-208757 | 8/1998 |
| JP | 2002-168439 | 6/2002 |

(Continued)

OTHER PUBLICATIONS

Japanese Office Action mailed Nov. 2, 2010, with English Translation.

(Continued)

*Primary Examiner* — Laura Weiner
(74) *Attorney, Agent, or Firm* — Kratz, Quintos & Hanson, LLP

(57) ABSTRACT

The solid oxide fuel cell of the present invention has a substrate (1); an electrolyte (3) that is disposed on one surface of the substrate (1); and at least one electrode element E having an anode (5) and a cathode (7) disposed on the same surface of the electrolyte (3) with a predetermined space therebetween.

2 Claims, 15 Drawing Sheets

(56) References Cited

FOREIGN PATENT DOCUMENTS

| | | |
|---|---|---|
| JP | 2002-175814 | 6/2002 |
| JP | 2002-280015 | 9/2002 |
| JP | 2002-280017 | 9/2002 |
| JP | 2002-280049 | 9/2002 |
| JP | 2002-313357 | 10/2002 |
| JP | 2002-329506 | 11/2002 |
| JP | 2003-51319 | 2/2003 |
| JP | 2003-264003 | 9/2003 |
| JP | 2004-55564 | 2/2004 |
| JP | 2004-164861 | 6/2004 |
| JP | 2004-319240 | 11/2004 |
| WO | WO 02/080299 | * 10/2002 |
| WO | WO 2004/066424 A2 | 8/2004 |

OTHER PUBLICATIONS

Communication from Chinese Patent Office dated Nov. 9, 2007.
Two (2) Japanese Office Actions mailed Jun. 9, 2010, with English Translations.
Japanese Office Action mailed Feb. 24, 2010, with English Translation.
Chinese Office Action dated Oct. 16, 2009, with English Translation.
Canadian Examination Report dated Aug. 25, 2011, in counterpart Canadian Patent Application No. 2533564.

* cited by examiner (a)

(b)

(a)

(b)

(a)

(b)

(a)

(b)

(a)

unit: mm (b)

SOLID OXIDE FUEL CELL

CROSS REFERENCE TO RELATED APPLICATION

This application is a Continuation Application of prior application Ser. No. 10/561,789, filed on Mar. 15, 2007, now U.S. Pat. No. 8,101,316, which was a §371 National Stage Application of PCT/JP04/009347, filed on Jun. 25, 2004, which is hereby incorporated by reference.

TECHNICAL FIELD

The present invention relates to a fuel cell, specifically, to a solid oxide fuel cell that stably generates electricity mainly in a mixed gas of fuel gas and oxidizing gas.

BACKGROUND OF THE INVENTION

Planar-type, tubular-type and other types of cell designs have been conventionally proposed for solid oxide fuel cells.

A planar-type cell comprises an anode and a cathode disposed on the front and back surfaces, respectively, of a flat electrolyte. A thus-formed cell is used in a condition where a plurality of such cells are laminated having an interconnector (separator) between adjacent cells. The interconnectors (separator) connect cells in series or in parallel, and completely separate the fuel gas supplied to each cell from the oxidizing gas. A gas seal is provided between each cell and separator (for example, Japanese Unexamined Patent Publication No. 1993-3045). However, in this planar-type cell, because the gas seal is provided by applying pressure to the cell, the cell is easily damaged by oscillation, heat cycles, etc. This poses a significant problem in bringing the fuel cell to practical use.

In contrast, a tubular-type cell disclosed in, for example, Japanese Unexamined Patent Publication No. 1993-94830, comprises an anode and a cathode disposed on the external surface and internal surface respectively, of a tubular electrolyte. Among tubular-type cells, vertical stripe-type and horizontal stripe-type fuel cells have been proposed. Although a tubular-type fuel cell is advantageous in having excellent gas-sealing properties, its production is complicated because its construction is more complex than that of a planar type cell and this makes the construction cost thereof high.

Furthermore, these cell designs have the following drawbacks: both in planar-type cells and tubular-type cells, the electrolyte needs to be thin to improve performance, and the ohmic resistance of the electrolyte material needs to be reduced. However, an unduly thin electrolyte lacks sufficient strength and decreases the vibration resistance and durability of the cell.

For this reason, a non-diaphragm-type solid oxide fuel cell has been proposed to take the place of the above-mentioned planar-type and tubular-type fuel cells, wherein, as disclosed in, for example, Japanese Unexamined Patent Publication No. 1996-264195, an anode and a cathode are arranged on the same surface of a solid electrolyte substrate, and electricity is generated by supplying a mixed gas of fuel and oxidizing gas. Because fuel gas and oxidizing gas do not need to be separated in this fuel cell, a separator and gas seal become unnecessary, and the construction and the production thereof can be significantly simplified.

In a non-diaphragm-type solid oxide fuel cell, because an anode and a cathode are formed in the vicinity of each other on the same surface of a solid electrolyte and conduction of oxygen ions occurs mainly on the surface of the electrolyte, the thickness of the electrolyte does not significantly effect the cell performance as it does in planar-type or tubular-type cells. Therefore, the electrolyte may be thickened while maintaining the same level of cell performance, and this can reduce its vulnerability to damage.

As described above, in prior-art solid oxide fuel cells, the vulnerability to damage is alleviated by thickening the electrolyte. However, because in many cases only those portions in the vicinity of the surface of the electrolyte contribute to the cell reaction, cell performance will not be significantly improved even if the electrolyte is thickened. Therefore, thickening the electrolyte merely increases its production costs.

The present invention aims to solve the above problem and provides a solid oxide fuel cell that can alleviate the vulnerability to damage, reduce its production costs, and obtain high power output.

DISCLOSURE OF THE INVENTION

The first solid oxide fuel cell of the present invention has been developed to solve the above problem. The solid oxide fuel cell comprises a substrate; an electrolyte that is disposed on one surface of the substrate; and at least one electrode element comprising an anode and a cathode that are disposed on the same surface of the electrolyte with a predetermined space therebetween.

It is preferable that the fuel cell further comprises another electrolyte disposed on the other surface of the substrate, and an electrode element which comprises an anode and a cathode that are disposed on the same surface of this electrolyte formed on the other surface of the substrate, with a predetermined distance therebetween.

A plurality of electrode elements may be disposed on each surface of the substrate using electrolyte. These electrode elements may be connected to one another using an interconnector disposed on the fuel cell. It is also possible to provide an interconnector on the side of a device to which the fuel cell is to be disposed so that these electrode elements can be connected to one another by the interconnector when the fuel cell is installed.

It is preferable that a groove be formed in the electrolyte so as to separate adjacent electrode elements from each other. The groove may be formed so as to cut through the electrolyte and reach the substrate.

It is also possible to partition the electrolyte between adjacent electrode elements. In this case, it is preferable that an insulating material be disposed between adjacent electrolytes. This arrangement eases the connection between electrode elements using an interconnector, and reliably separates the electrolytes from each other.

In the fuel cell, it is preferable that the electrolyte be formed by printing. Alternatively, the electrolyte may be formed into a plate-like or sheet-like shape, and adhered to the substrate via adhesive.

In the fuel cell, it is preferable that electrode elements be formed in such a manner that one of the electrodes is surrounded by the other electrode with a predetermined space therebetween.

The second solid oxide fuel cell of the present invention comprises a plurality of single cells each having an electrolyte, an anode, and a cathode, the solid oxide fuel cell further comprising a substrate for supporting the plurality of single cells, and wherein the electrolyte of each single cell is disposed on the substrate so as to have a predetermined space therebetween.

A plurality of cells may be arranged on each surface of the substrate. These cells may be connected to one another using an interconnector disposed on the fuel cell. It is also possible to provide an interconnector on the side of a device to which the fuel cell is to be disposed so that these cells can be connected one another by the interconnector when the fuel cell is installed.

In this fuel cell, it is preferable that the electrolyte be formed by printing. It is also possible to form the electrolyte into a plate-like shape and attach the electrolyte to the substrate via adhesive.

In each of the above-explained fuel cell, it is preferable that the substrate be formed from a ceramic material.

BEST MODE FOR CARRYING OUT THE INVENTION

First Embodiment

Figure 1:
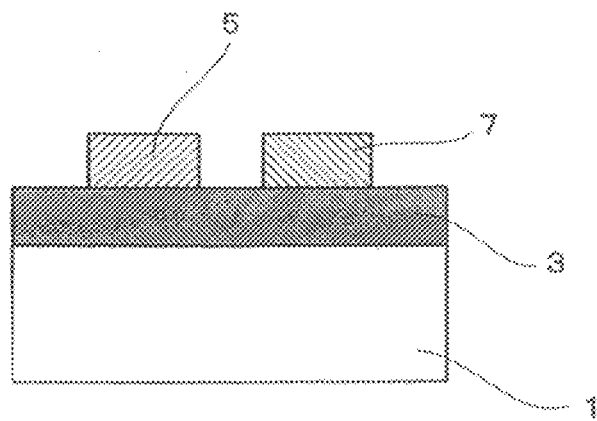
FIG. 1 is a partially expanded sectional view of a fuel cell according to the first embodiment of the present invention.

Hereunder, a first embodiment of the solid oxide fuel cell of the present invention is explained with reference to the drawings. FIG. 1 is a partial cross-sectional view of a fuel cell of the present embodiment and FIG. 2 is a schematic plan view of the fuel cell.

Figure 2:
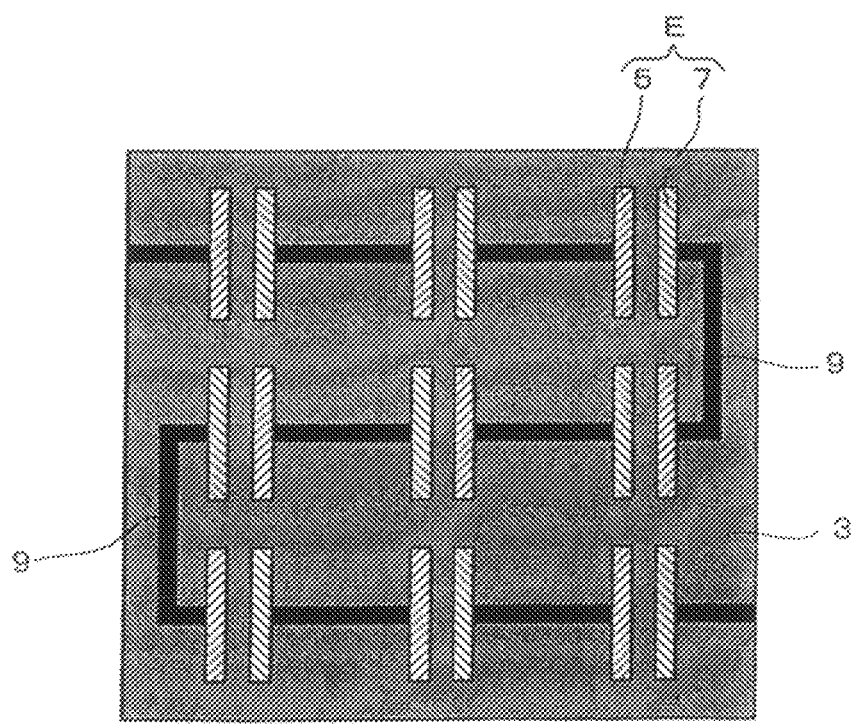
FIG. 2 is a schematic plan view of the fuel cell of FIG. 1.

As shown in FIGS. 1 and 2, this fuel cell comprises a sheet-like substrate 1, and an electrolyte 3 laminated on one surface of the substrate 1, wherein a plurality of electrode elements (single cells) E each comprising a pair of anode 5 and cathode 7 is disposed on the same surface of the electrolyte 3. In each electrode element E, an anode 5 and a cathode 7 are formed into a strip-like shape and arranged to have a predetermined space therebetween. The distance between the anode 5 and the cathode 7 is preferably 1 µm to 500 µm, and more preferably 10 µm to 500 µm.

As described above, a plurality of electrode elements E are formed on the electrolyte 3 and these electrode elements E are connected to one another in series via an interconnector 9. In other words, the cathode 7 of each electrode element E is connected to the anode 5 of an adjacent electrode element E via an interconnector 9.

The materials for the fuel cell having the above structures are explained below. It is preferable that the substrate 1 be formed of a material having excellent adhesiveness to the electrolyte 3. Specific examples of usable materials are SUS, as well as alumina-based materials, silica-based materials, titania-based materials and the like ceramic-based materials. Ceramic-based materials having excellent heat resistance of at least 1000° C. are particularly preferable. Note that the thickness of the substrate 1 is preferably not less than 50 µm.

Known materials for solid oxide fuel cell electrolytes may be used as the material for the electrolyte 3. Specific examples of usable materials include oxygen ion-conductive ceramic materials such as ceria-based oxides doped with samarium, gadolinium, and/or the like, strontium- and/or magnesium-doped lanthanum gallate-based oxides, scandium and/or yttrium-containing zirconia-based oxides, etc. The thickness of the electrolyte 3 is preferably 10 µm to 5000 µm, and more preferably 50 µm to 2000 µm.

The anode 5 and the cathode 7 may be formed from a ceramic powder material. The average particle diameter of such a ceramic powder is generally 10 nm to 100 µm, preferably 50 nm to 50 µm, and more preferably 100 nm to 10 µm. The average particle diameter can be measured, for example, in accordance with JISZ8901.

The anode 5 may be formed from a mixture of a metal catalyst and ceramic powder comprising an oxide ion conductor. Examples of usable metal catalysts are those that are stable in reducing atmospheres and exhibit hydrogen oxidizing activity, such as nickel, iron, cobalt, noble metals (platinum, ruthenium, palladium, etc.), etc. Oxide ion conductors having a fluorite or perovskite structure are preferably used. Examples of oxide ion conductors having a fluorite structure are ceria-based oxides doped with samarium, gadolinium, and/or the like, scandium and/or yttrium-containing zirconia-based oxides, etc. Examples of oxide ion conductors having a perovskite structure are strontium- and/or magnesium-doped lanthanum gallate oxides. Among the above materials, it is preferable to form the anode 4 from a mixture of an oxide ion conductor and nickel. To prepare the mixture, a ceramic material containing an oxide ion conductor and nickel may be physically mixed, or nickel may be modified with a ceramic powder. The above-mentioned ceramic materials may be used singly or as a combination of two or more such materials. The anode 5 may be formed from a single metal catalyst.

Metal oxides of Co, Fe, Ni, Cr, Mn, etc., having a perovskite structure may be used as a ceramic powder material for the cathode 7. Specific examples thereof include oxides such as $(Sm, Sr)CoO_3$, $(La, Sr)MnO_3$, $(La, Sr)CoO_3$, $(La, Sr)(Fe, Co)O_3$, $(La, Sr)(Fe, Co, Ni)O_3$, etc. Among those, $(La, Sr)MnO_3$ is particularly preferable. Such ceramic materials may be used singly or as a combination of two or more such materials.

The anode 5 and the cathode 7 are formed by using the above materials as main ingredients and adding appropriate amounts of binder resin, organic solvent, etc. To be more specific, it is preferable that binder resin and the like be added in such a manner that the content of the main ingredients is 50 to 95 wt. %. The thickness of the cathode 3 and the anode 5 after sintering is preferably 1 μm to 500 μm, and more preferably 10 μm to 100 μm.

As with the anode 5 and the cathode 7, the electrolyte 3 is formed by using the above materials as main ingredients and adding suitable amounts of binder resin, organic solvent, etc. In the mixture of the main ingredients and binder, it is preferable that the content of the main ingredients be not less than 80 wt. %. It is also possible to subject the powder comprising the above-mentioned materials to uniaxial press molding and cold isostatic pressing (CIP), sinter the resultant at a predetermined temperature for a predetermined period of time, and then cut the resultant into a plate-like or sheet-like shape having desirable thickness and other dimensions. The thus-obtained plate-like or sheet-like shaped electrolyte 3 is attached to the substrate 1 via adhesive, thus obtaining a fuel cell. Note that when the electrolyte 3 is formed by printing, it is preferable that a stress relaxation layer formed from an adhesive material whose coefficient of thermal expansion is between that of the substrate 1 and the electrolyte 3 be disposed between the substrate 1 and the electrolyte 3. This prevents cracking of the thin film during sintering due to the differences in the coefficients of expansion of the substrate 1 and the electrolyte 3.

In a fuel cell having the above-described structure, power is generated in the following manner: a gas mixture of fuel gas containing hydrocarbons, such as methane and ethane, together with air or a like oxidizing gas is supplied to one surface of a single cell C at a high temperature (for example, 400° C. to 1000° C.). This initiates ionic oxygen conduction in the electrolyte 3 that is sandwiched between the anode 5 and the cathode 7, thus generating electric power. In a fuel cell having the above-described structure, those portions other than the vicinity of the surface of the electrolyte 3 do not significantly contribute to the cell reaction, and therefore the production costs can be decreased by making the electrolyte 3 thin to an extent that does not adversely affect the cell performance. In the fuel cell of the present embodiment, because the electrolyte 3 is supported on the substrate 1, even when the electrolyte 3 is a thin film, high resistance to oscillation and heat cycles can be maintained.

By connecting a plurality of electrode elements E in series using an interconnector 9, high voltage output can be achieved. The interconnector 9 can be formed of conductive metals such as Pt, Au, Ni, Ag, Cu, SUS, metal materials, or lanthanum chromite-based materials such as La (Cr, Mg)$O_3$, (La, Ca)$CrO_3$, and (La, Sr)$CrO_3$. Such materials can be used singly or as a combination of two or more such materials. It is also possible to add additives such as binder resin described above.

Furthermore, the interconnector 9 may be formed on the electrolyte 3 via an insulating layer. In this case, it is preferable that the material for the insulating layer be a ceramic-based material as these have excellent heat resistance. Specific examples of usable ceramic-based materials are alumina-based materials, silica-based materials, titania-based materials and like ceramic-based materials. By arranging the interconnector 9 on the electrolyte 3 via an insulating layer, electrical contact between the interconnector 9 and the electrolyte 3 can be prevented. This arrangement has the following advantage. If the interconnector is formed on the electrolyte to connect adjacent electrode elements as in conventional techniques, the interconnector exhibits electrical conductivity and, sometimes, ion conductivity similar to that observed in electrode reactions, and may function in the same manner as an electrode. This may reduce the intrinsic open circuit voltage of the fuel cell. In contrast, in the structure of the present embodiment, because the interconnector 9 and the electrolyte 3 are not in electrical contact with each other, reduction of open circuit voltage can be prevented. This also prevents the open circuit voltage from becoming unstable, and achieves desirable output characteristics.

Figure 3:
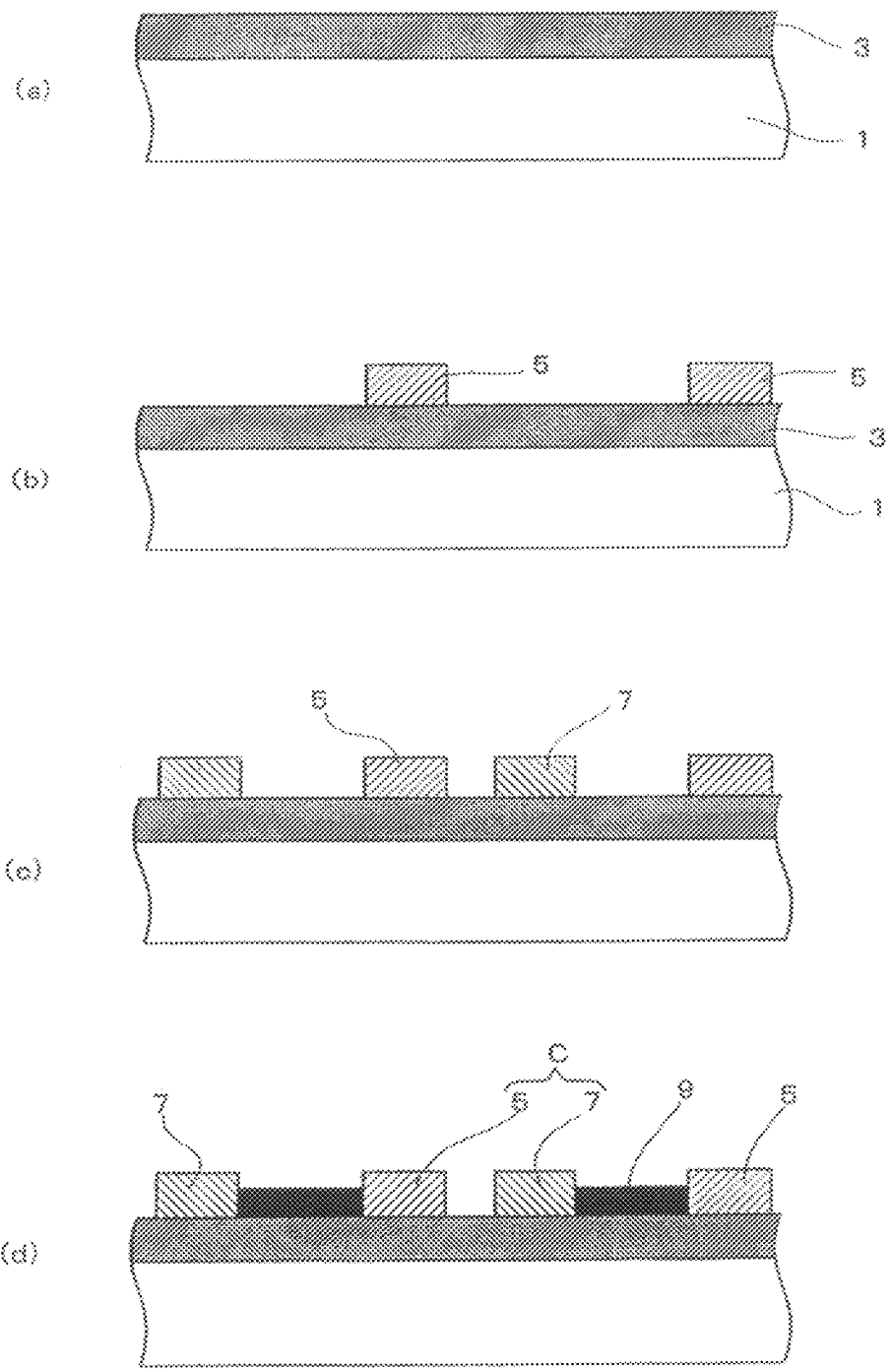
FIG. 3 illustrates one example of the procedure for producing the fuel cell of FIG. 1.

One example of a method for producing the above-described fuel cell is explained below with reference to FIG. 3. First, electrolyte paste, anode paste, and cathode paste are prepared by using the above-described powder materials for the electrolyte 3, anode 5, and cathode 7 as main ingredients, and mixing these pastes with appropriate amounts of binder resin, organic solvent, etc. The viscosity of each past is preferably about $10^3$ mPa·s to $10^6$ mPa·s, which is desirable for conducting screen printing described latter. In the same manner, binder resin and/or other additives are added to the above-described powder material to prepare interconnector paste. The viscosity of the interconnector paste is the same as that mentioned above.

Second, the electrolyte paste is applied on the substrate 1 by screen printing, and dried and sintered at a predetermined temperature for a predetermined time period, thus formed the electrolyte 3 (FIG. 3(a)). Subsequently, the anode paste is applied to a plurality of portions on the electrolyte so as to have strip-like shapes by screen printing, and then the paste is dried and sintered at a predetermined temperature for a predetermined time period, forming a plurality of anodes 5 (FIG. 3(b)). Subsequently, the cathode paste is applied to portions facing the anodes 5 by screen printing, and the paste is dried and sintered at a predetermined temperature for a predetermined time period, forming a plurality of electrode elements C (FIG. 3(c)). In the last step, the interconnector paste is linearly applied between the electrode elements C by screen printing so that the plurality of electrode elements C are connected to one another in series by the interconnector 9. The interconnector 9 is thus formed (FIG. 3(d)).

In the above-described fuel cell, because electrolyte lies between the adjacent electrode elements, this electrolyte may function as a path through which oxygen ions migrate during generation of electric power. Therefore, the electrolyte between the electrode elements together with the anode and the cathode sandwiching the electrolyte may form a fuel cell and generate electric power. In this structure, the open circuit voltage that is inherent in a single cell and the open circuit voltage generated between single cells cancel each other and therefore a short circuit occurs inside the cell. It is believed that this reduces the open circuit voltage of a fuel cell as a whole. Therefore, even if the number of the electrode elements is increased, the open circuit voltage as a whole may not be equal to the "open circuit voltage per electrode element times the number of electrode elements". The second embodiment of the present invention that was developed taking this drawback into consideration is explained below.

Second Embodiment

Figure 4:
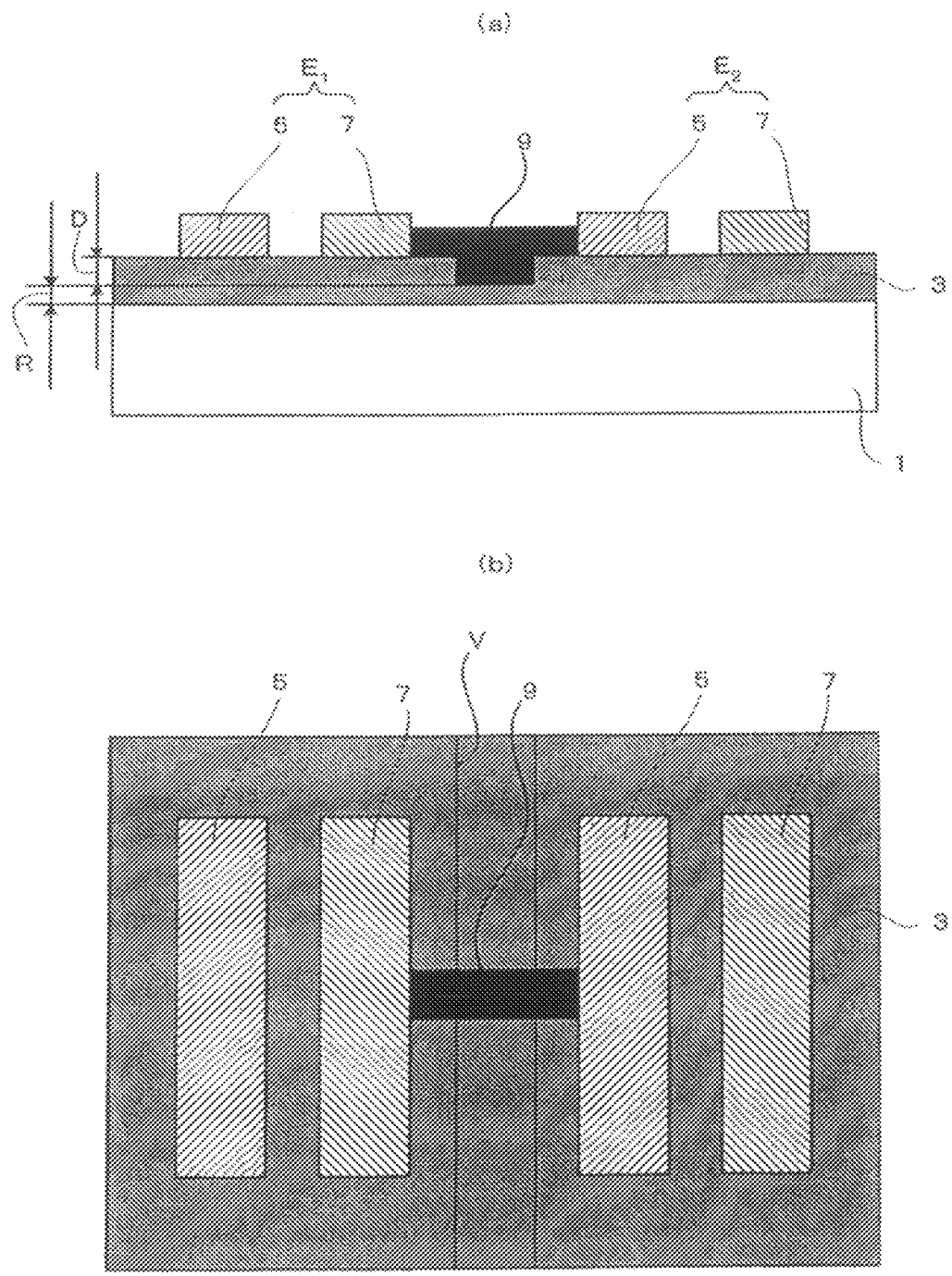
FIG. 4 shows a fuel cell according to the second embodiment of the present invention, wherein (a) is a partial cross-sectional view and (b) is a schematic plan view.

A solid oxide fuel cell of the second embodiment of the present invention is explained below. FIG. 4 shows the fuel cell of the present embodiment wherein (a) is a side elevational view and (b) is a plan view. Here, a fuel cell comprising two electrode elements is explained.

As shown in FIG. 4, this fuel cell comprises a sheet-like substrate 1 and an electrolyte 3 formed on one surface of the substrate 1, wherein two electrode elements E each having an anode 5 and a cathode 7 pair are disposed on the same surface of the electrolyte 3. The structure of each electrode element E is the same as in the first embodiment. A groove V is formed between the electrode elements E to partition them. A cathode 7 in one electrode element $E_1$ is connected to an anode 5 in the adjacent electrode element $E_2$ by an interconnector 9 so as to cross the groove V. A portion of the interconnector 9 is inserted in the groove V.

The materials for the substrate 1, electrolyte 3, anode 5, cathode 7, and interconnector 9 used in the present embodiment are the same as those used in the first embodiment, and therefore detailed explanation is omitted here. The method for generating electrical power of the present embodiment is also the same as that of the first embodiment.

As described above, in the present embodiment, a groove V, whose depth D is greater than the thickness R of the electrolyte 3 beneath the groove, is formed in the electrolyte 3 between the electrode elements $E_1, E_2$ (for example, D=800 μm, R=200 μm). This reduces the path in the electrolyte 3 between the electrode elements $E_1$, $E_2$ through which oxygen ions migrate. As a result, generation of electrical power is minimized, and therefore reduction of the voltage is prevented. Note that the width of groove V is preferably 1 μm to 5000 μm, as described in the third embodiment.

Figure 5:
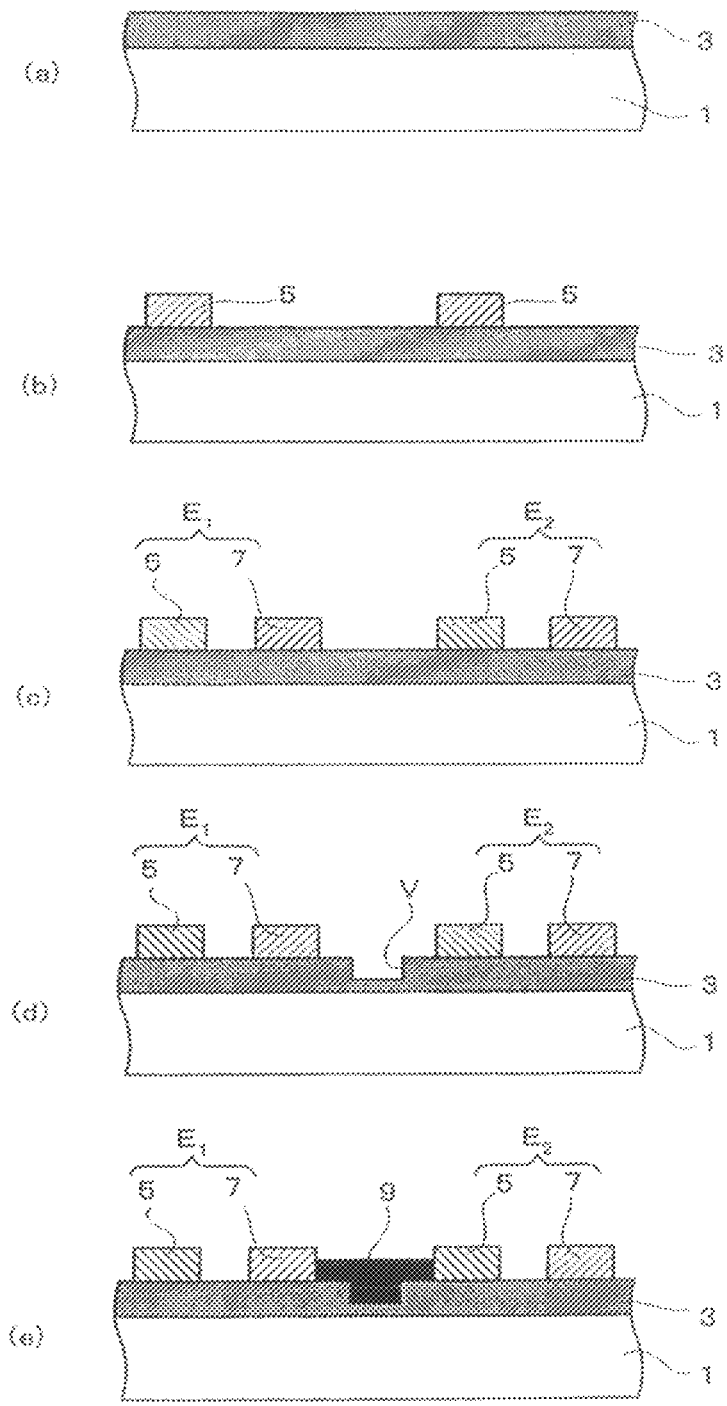
FIG. 5 illustrates one example of the procedure for producing the fuel cell of FIG. 4.

A method for producing the fuel cell is explained with reference to FIG. 5. The electrolyte paste, anode paste, cathode paste, and interconnector paste used in the present embodiment are the same as in the first embodiment. As shown in FIG. 5($a$) to FIG. 5($c$), an electrolyte 3, anodes 5, and cathodes 7 are formed on the substrate 1. The production procedure until here is the same as that in the first embodiment.

A groove V is then formed in the electrolyte substrate 3 between the electrode elements $E_1, E_2$ (FIG. 5($d$)). The groove V may be formed by, for example, blasting, laser beam machining, cutting, etc. An interconnector 1 is then formed by applying interconnector paste between the anode 5 in the electrode element $E_2$ and the cathode 7 in the electrode element $E_1$ as shown in FIG. 5($e$), obtaining the fuel cell shown in FIG. 4.

In this embodiment, the path through which oxygen ions migrate is reduced by providing a groove in the electrolyte between the electrode elements, and therefore electrical power generation between the electrode elements is reduced. However, it is also possible to completely partition the electrolyte between the electrode elements connected by the interconnector. Such an embodiment is explained below.

Third Embodiment

Figure 6:
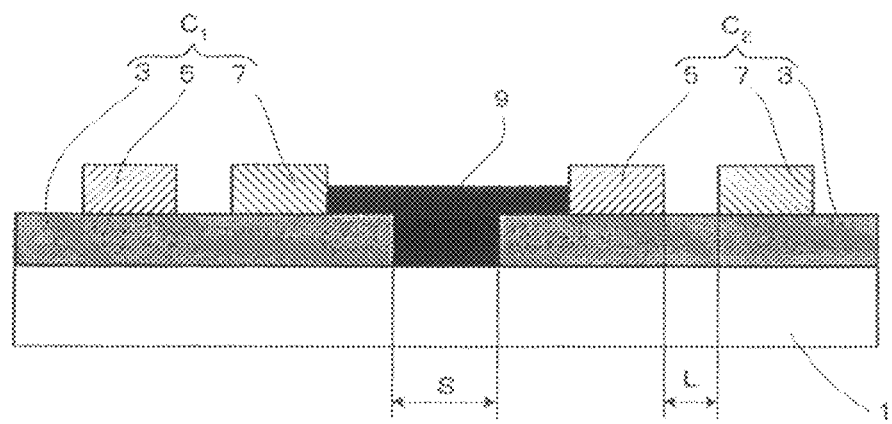
FIG. 6 shows a fuel cell according to the third embodiment of the present invention, wherein (a) is a partial cross-sectional view and (b) is a schematic plan view.
Figure 6:
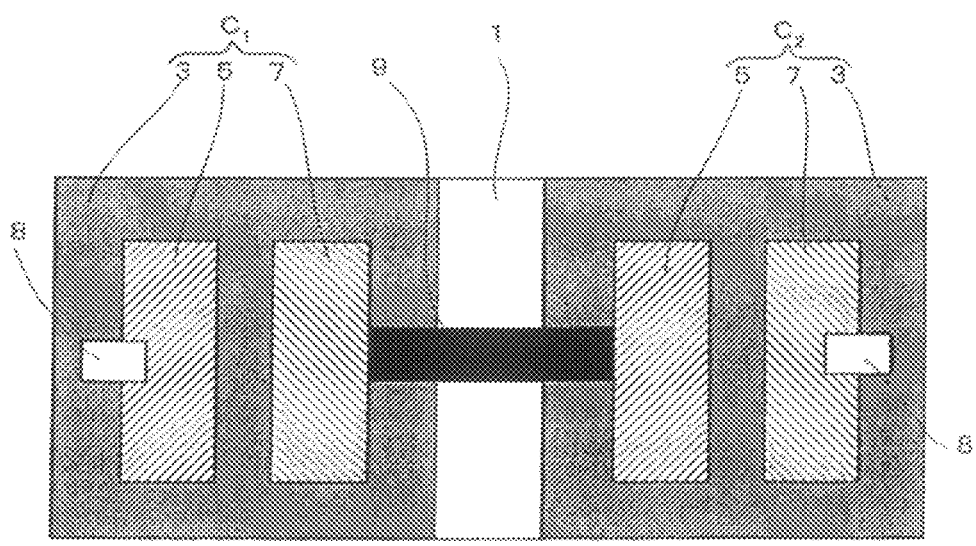

A solid oxide fuel cell of the third embodiment of the present invention is explained below with reference to the drawings. FIG. 6 shows the fuel cell of the present embodiment, wherein (a) is a partial cross-sectional view and (b) is a schematic plan view.

As shown in FIG. 6, this fuel cell comprises a sheet-like substrate 1 and a plurality of single cells C (in FIG. 6, two single cells $C_1, C_2$) disposed on one surface of the substrate 1. The single cells C are connected in series via an interconnector 9.

Each single cell C comprises a rectangular electrolyte 3 disposed on one surface of the substrate 1 and an anode 5 and a cathode 7 pair disposed on the same surface of the electrolyte 3. The electrolyte 3 of each single cell C is located so as to be at a predetermined distance from the electrolyte 3 of the adjacent single cell C so that a gap S is formed between the electrolytes 3. The gap is preferably, for example, 10 μm to 5000 μm, and more preferably 10 μm to 500 μm. The anode 5 and the cathode 7 on the electrolyte 3 are formed into strip-like shapes, and arranged so as to have a predetermined space therebetween. The distance L between the anode 5 and the cathode 7 is preferably 1 μm to 5000 μm, and more preferably 10 μm to 500 μm. As shown in FIG. 2, a current collector member 8 is provided on each of the end electrodes of the fuel cell, i.e., the anode 5 of one single cell $C_1$ and the cathode 7 of the other single cell $C_2$.

As described above, the interconnector 9 connects adjacent single cells C. Specifically, the interconnector 9 connects a cathode 7 of one single cell $C_1$ to an anode 5 of the other single cell $C_2$. In this structure, the interconnector 9 is formed on the electrolyte 5, and disposed on the substrate 1 between the adjacent single cells C so as to cross over the gap S.

The materials for the substrate 1, electrolyte 3, anode 5, cathode 7, and interconnector 9 used in the present embodiment are the same as in the first embodiment, and therefore detailed expiation is omitted here. The method for generation electrical power is also the same as that of the first embodiment. Note that the material for the current collector member 8 is the same as that for the interconnector.

As described above, in the fuel cell of the present embodiment, because the electrolyte 3 is supported by the substrate 1, even when the electrolyte 3 is a thin film, high resistance against oscillation and heat cycles can be maintained. In the above-explained fuel cell, each single cell C is arranged separately having gaps therebetween and connected via an interconnector 9. In this embodiment, because no electrolyte 3 exists between the single cells C, migration of oxygen ions between the single cells C is prevented, and formation of a fuel cell between single cells can be prevented. As a result, reduction of the open circuit voltage of the fuel cell is prevented, and therefore high output can be obtained.

Figure 7:
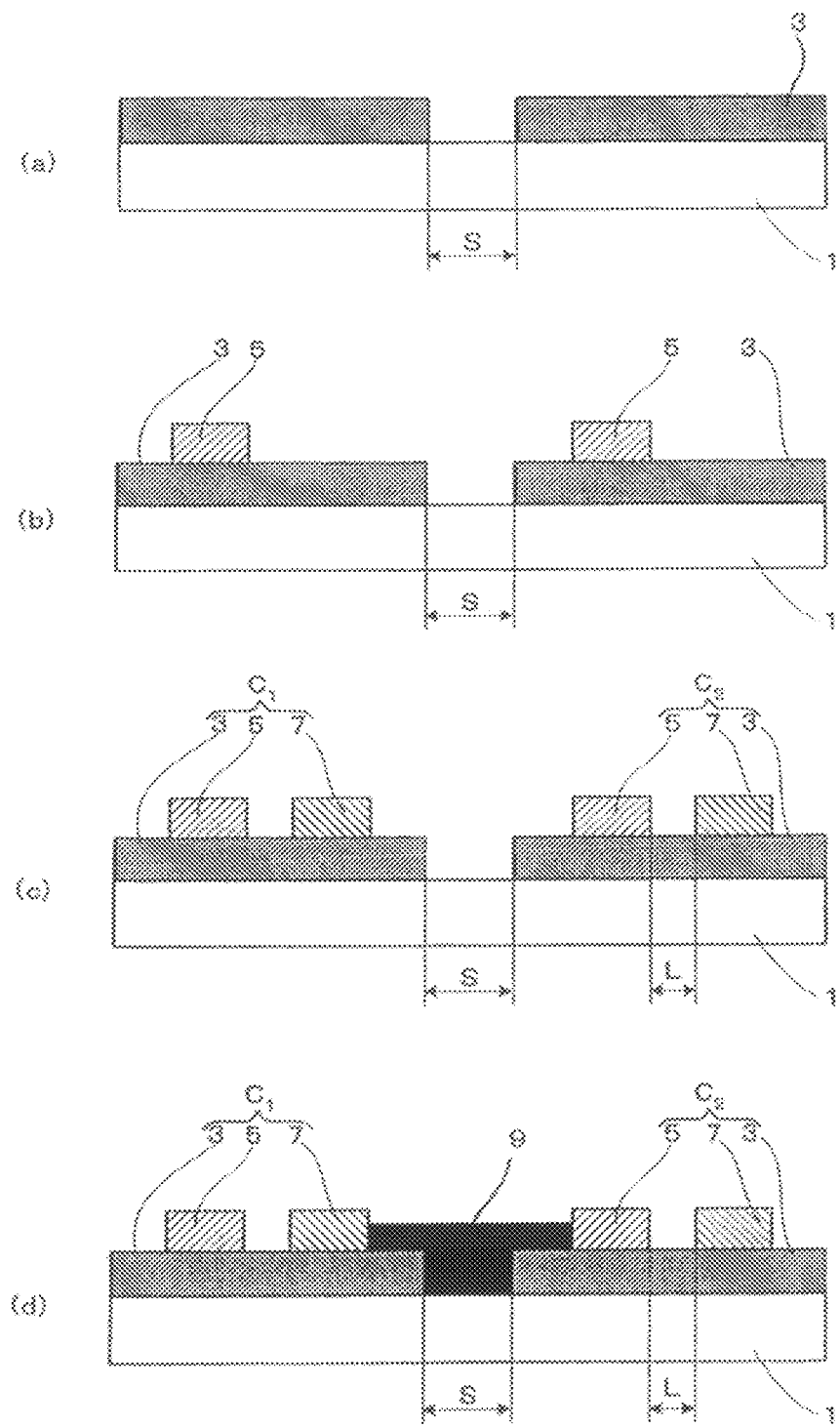
FIG. 7 illustrates one example of the procedure for producing the fuel cell of FIG. 6.

One example of a method for producing the above-described fuel cell is explained below with reference to FIG. 7. First, electrolyte paste, anode paste, and cathode paste are prepared by using the above-mentioned powder materials for the electrolyte 3, anode 5, and cathode 7 as main ingredients, and adding and mixing each paste with suitable amounts of binder resin, organic solvent, etc. The viscosity of each paste is preferably about $10^3$ mPa·s to $10^6$ mPa·s, which is desirable for screen printing described latter. In the same manner, interconnector paste is prepared by adding binder resin and/or other additives to powder materials. The viscosity of the interconnector paste is the same as that of the paste mentioned above.

Second, the electrolyte paste is applied to a plurality of portions of the substrate 1 by screen printing, and dried at predetermined temperature for a predetermined time period. A plurality of rectangular electrolytes 3 having predetermined gaps S between each other are thus formed (FIG. 7($a$)). Subsequently, anode paste is applied to each electrolyte 3 by screen printing so as to have strip-like shapes, and dried and sintered at a predetermined temperature for a predetermined time period, forming anodes 5 (FIG. 7($b$)). Cathode paste is then applied by screen printing to each electrolyte 3 in regions facing the anodes 5, and dried and sintered at a predetermined temperature for a predetermined time period, thus forming cathodes 7. A plurality of single cells C are thus formed (FIG. 7($c$)). In the last step, an interconnector 9 is formed by linearly applying interconnector paste between single cells C by screen printing so that the plurality of single cells C are connected to one another in series. In this embodiment, the interconnector 9 is formed so as to cross the gap S between the electrolytes 3 and to pass immediately above the substrate 1.

Current collector members 8 are provided at the ends of the interconnector 9. By the above procedure, production of the fuel cell is completed (FIG. 7(d)). When a plurality of single cells are formed using a photosensitive polymer as binder resin, a plurality of single cells or electrolytes having a desirable pattern can be obtained by the following method. After applying and drying paste, the paste is exposed to light using a mask so as to have a plurality of patterns, the unexposed portions are removed, and the remaining portions are then sintered.

Embodiments of present invention are explained above; however, the present invention is not limited to these embodiments and various modifications can be made as long as such modifications do not adversely affect the present invention. For example, in the production methods of the above-described embodiments, screen printing is employed for applying each paste; however, it is also possible to employ doctor blade coating, spray coating, lithography, electrophoretic deposition, roll coating, dispenser coating, CVD, EVD, sputtering, and transfer printing, as well as other typically used printing methods. Isostatic pressing, oil hydraulic pressing, and other typically used pressing methods may be employed as post-printing processes.

When an electrolyte is formed by employing an above-mentioned printing method, it is preferable to provide a stress relaxation layer between the substrate 1 and the electrolyte 3. Such a stress relaxation layer is formed from an adhesive material having a coefficient of thermal expansion between that of the substrate 1 and the electrolyte 3. This prevents cracking in the electrolyte during sintering due to differences in coefficients of expansion between the substrate 1 and the electrolyte 3.

Figure 8:
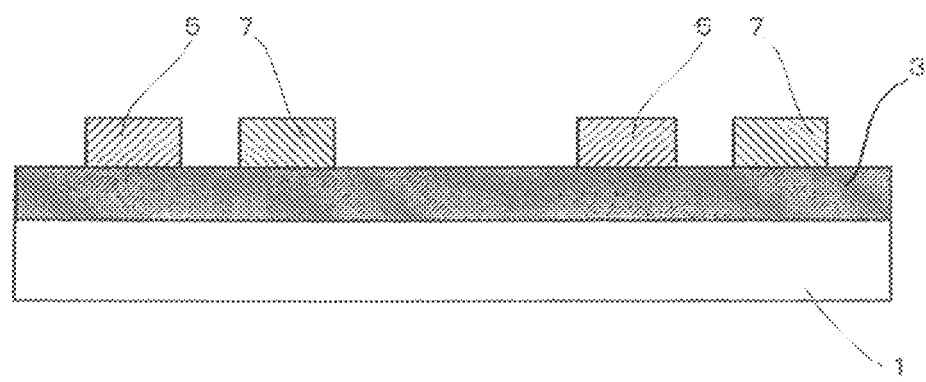
FIG. 8 illustrates an example of the procedure for producing the fuel cell of the third embodiment.
Figure 8:
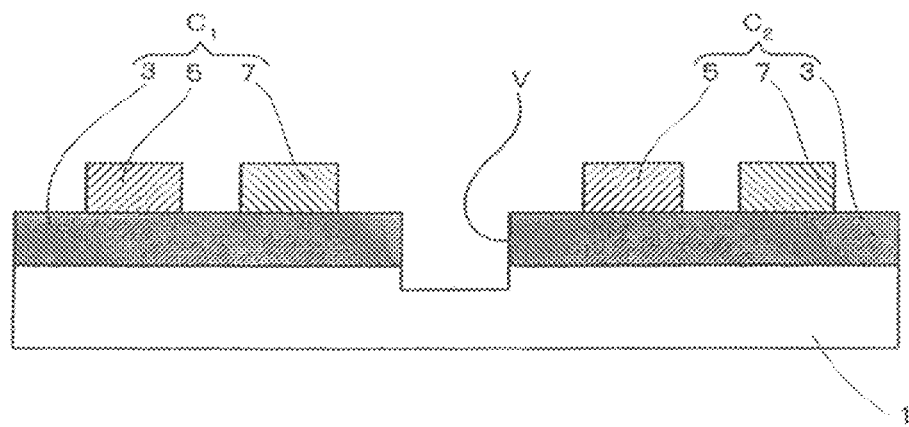

Alternatively, it is also possible to obtain a fuel cell by preparing a plate-like or sheet-like shaped electrolyte, and attaching it to a substrate using adhesive. In this case, in particular when a fuel cell of the third embodiment is formed, a fuel cell can be obtained by attaching each of a plurality of electrolytes of single cell having predetermined dimensions. Alternatively, it is also possible to obtain a fuel cell by attaching an electrolyte to a substrate, and partitioning the electrolyte into single cells by cutting. For example, as shown in FIG. 8, a plurality of single cells C can be formed by attaching the electrolyte 3 to the substrate 1, providing electrodes 5 and 7 (FIG. 8(a)), and forming a groove V that cuts through the electrolyte 3 and reaches the substrate 1 so as to partition the electrolyte 3 (FIG. 8(b)).

Figure 9:
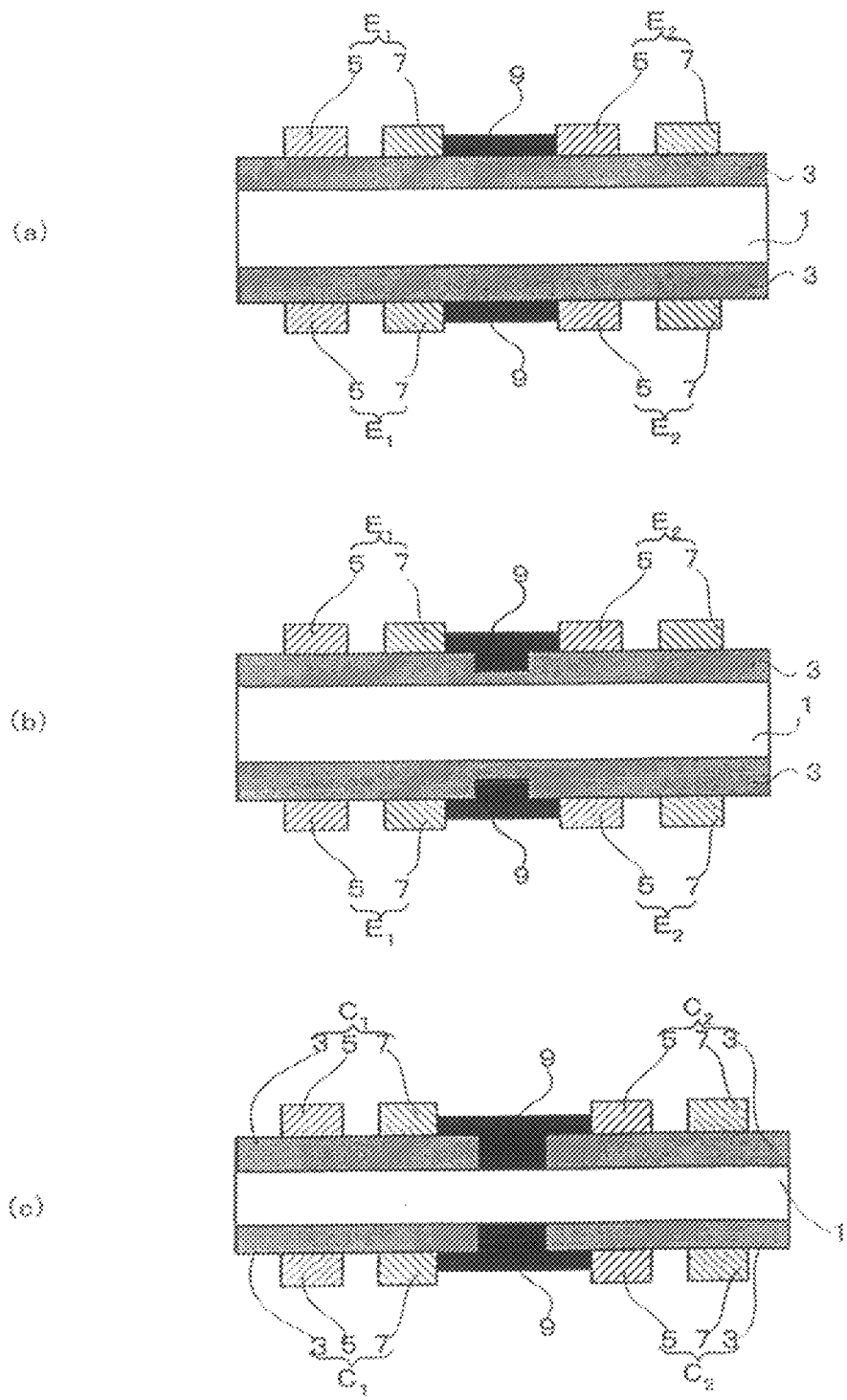
FIG. 9 is a cross-sectional view of another example of the fuel cell of the present invention.

In the above embodiments, the electrolyte 3, the anode 5, and the cathode 7 are formed only on one surface of the substrate 1; however, it is also possible to provide an electrolyte 3, an anode 5, and a cathode 7 on the other surface of the substrate 1 as shown in FIG. 9. Note that FIG. 9(a) to FIG. 9(c) correspond to the first to third embodiments, respectively. An example of a method for producing such fuel cells is such that, during forming the electrolyte 3, the anode 5 and the cathode 7 on one surface of the substrate 1, another electrolyte, anode and cathode are also formed on the other surface of the substrate 1 in the same manner, and two cells having the same structure disposed one on each surface of the substrate 1 are thus formed. This arrangement makes it possible to obtain high output (electric power) while maintaining the compactness of the fuel cell.

Figure 10:
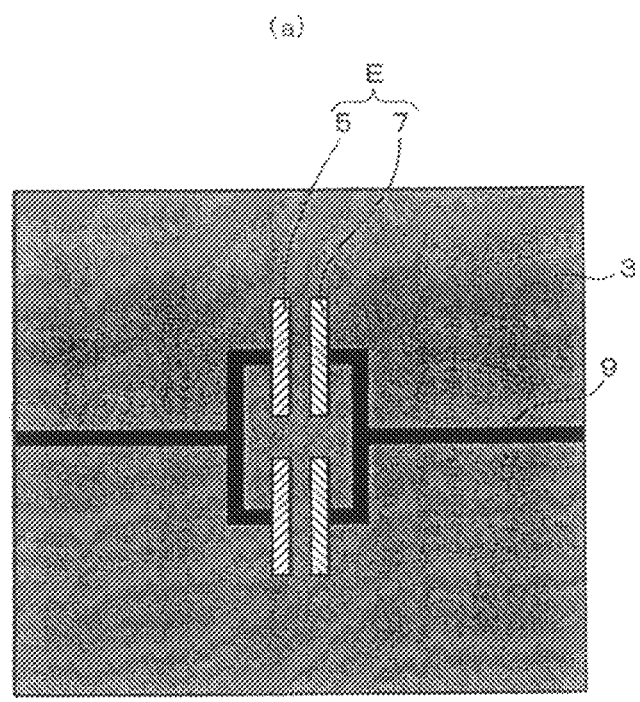
FIG. 10 is a plan view of the still another example of the fuel cell of the present invention.
Figure 10:
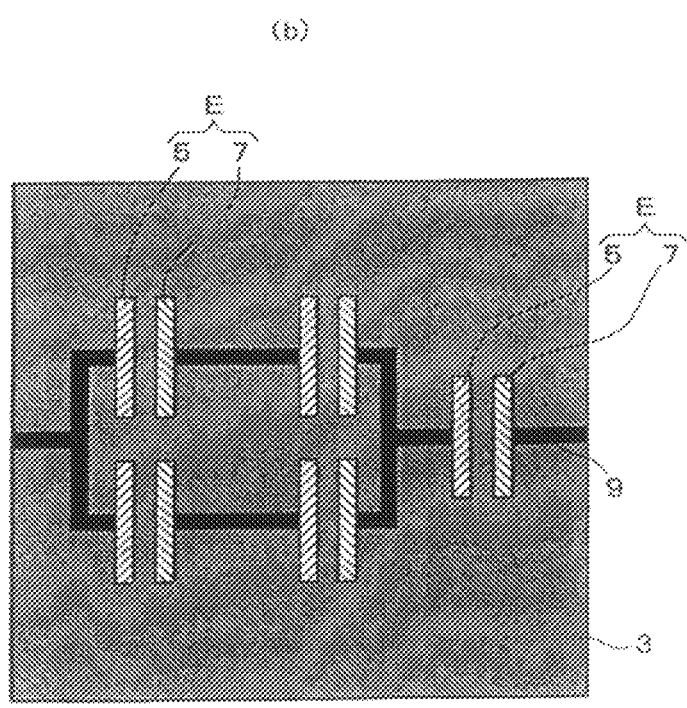

In the above embodiments, a plurality of electrode elements E or single cells C are connected in series via an interconnector 9; however, it is also possible to connect them in parallel. For example, as shown in FIG. 10(a), in the first embodiment, the interconnector 9 may connect an anode in one electrode element E to an anode in the other electrode element E and a cathode 7 in one electrode element E to a cathode 7 in the other electrode element E. Alternatively, it is also possible to incorporate both series and parallel circuits. By such combination, desirable voltage and electric current can be obtained. Needless to say, it is also possible to form a fuel cell using a single electrode element E rather than a plurality of electrode elements E.

Figure 11:
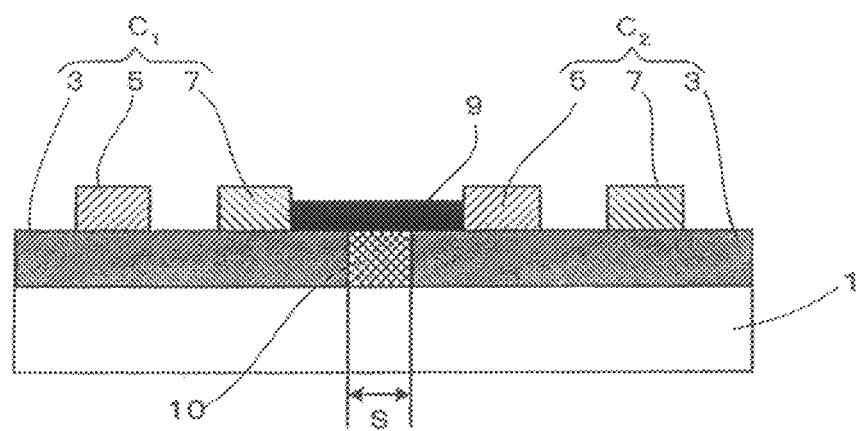
FIG. 11 is a cross-sectional view of another example of the fuel cell of FIG. 6.

It is also possible to form gaps between adjacent electrolytes 3, and, as shown in FIG. 11, an insulating film 10 may be disposed in the gap S between electrolytes 3. This allows adjacent electrolytes 3 to be partitioned by the insulating film 10, electrically separating single cells C from each other in a more reliable manner, and making the connection via the interconnector 9 easier. Therefore, formation of a fuel cell between single cells C can be reliably prevented, obtaining high output.

In this structure, it is preferable that the insulating film 10 be formed from a ceramic-based material. Examples of usable ceramic-based materials are alumina-based and silica-based ceramic materials. As with the electrolyte, etc., the particle diameter of the ceramic material powder forming the insulating film 10 is generally 10 nm to 100 μm and preferably 100 nm to 10 μm. The insulating film 10 is formed by using a ceramic material powder as main ingredients and adding suitable amounts of binder resin, organic solvent, etc. As with the electrolyte, etc., the thickness of the insulating film 10 after sintering is generally 1 μm to 500 μm, and preferably 10 μm to 100 μm.

Figure 12:
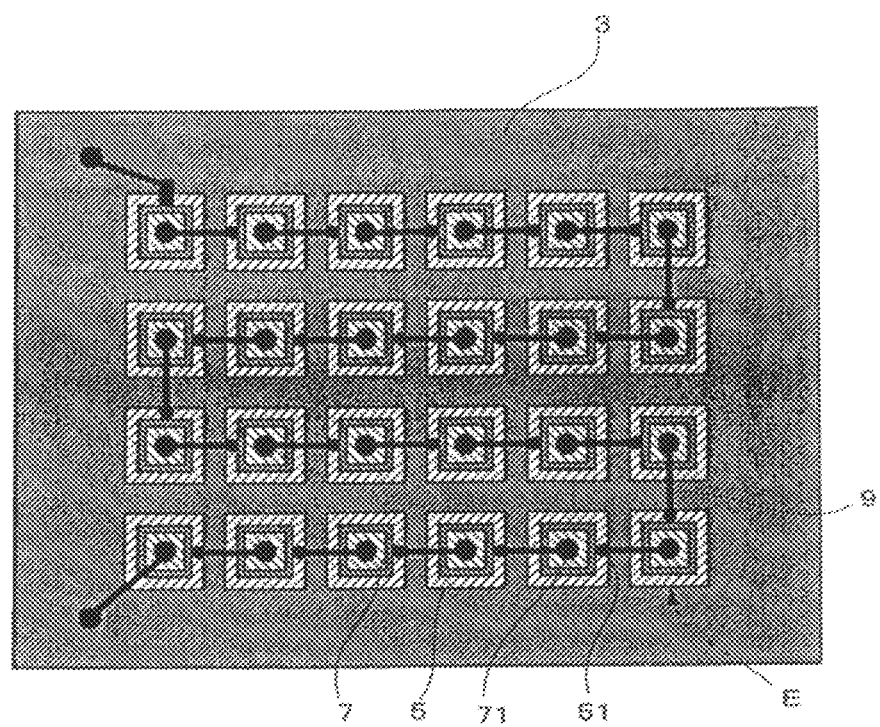
FIG. 12 is a plan view of the still another example of the fuel cell of the present invention.
Figure 13:
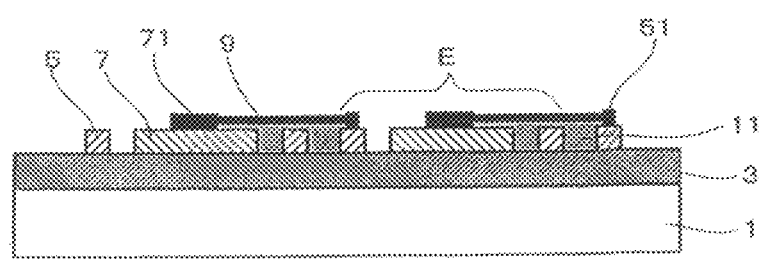
FIG. 13 is a partially expanded sectional view of the fuel cell of FIG. 12.

In the above embodiments, the electrodes are formed into strip-like shapes, and the anode and the cathode are aligned alternately; however, the shape of the electrode is not limited to this, and the following arrangement may also be employed. As shown in FIGS. 12 and 13, such a fuel cell comprises 24 electrode elements E and these electrode elements E are connected to one another via interconnectors 9.

Each electrode element E comprises an anode 5 and a cathode 7, wherein a frame-like anode 5 is disposed around a rectangular cathode 7 with a predetermined space therebetween. The external shape of the anode 5 is rectangular in correspondence with the rectangular cathode 7. In this arrangement, the distance between the anode 5 and the cathode 7 is preferably 1 μm to 1000 μm, and more preferably 10 μm to 500 μm. Current collector members 51 and 71 for outputting electric current are formed on the anode 5 and the cathode 7, respectively. Each current collector member 51 on an anode 5 is connected to the current collector member 71 on a cathode 7 in the adjacent electrode element E by an interconnector 9, thereby connecting the electrode elements E in series. Note that the distance between adjacent electrode elements E is preferably 10 μm to 5000 μm and more preferably 1000 μm to 3000 μm.

Each interconnector 9 has the configuration as shown in FIG. 13. As shown in FIG. 13, between the current collector members 51 and 71 at the ends of the interconnector (i.e. crossover section), an insulating layer 11 is formed over the anode 5, the cathode 7, and the electrolyte 1. The interconnector 9 is formed on the insulating layer 11. The interconnector 9 thereby passes over the anode 5 but does not short circuit the anode.

The above structure makes integration of circuits easier, and therefore high electrical power output can be obtained. The shapes of the fuel and cathodes are not limited to rectangular and they may be formed into, for example, circular or polygonal shapes.

Figure 14:
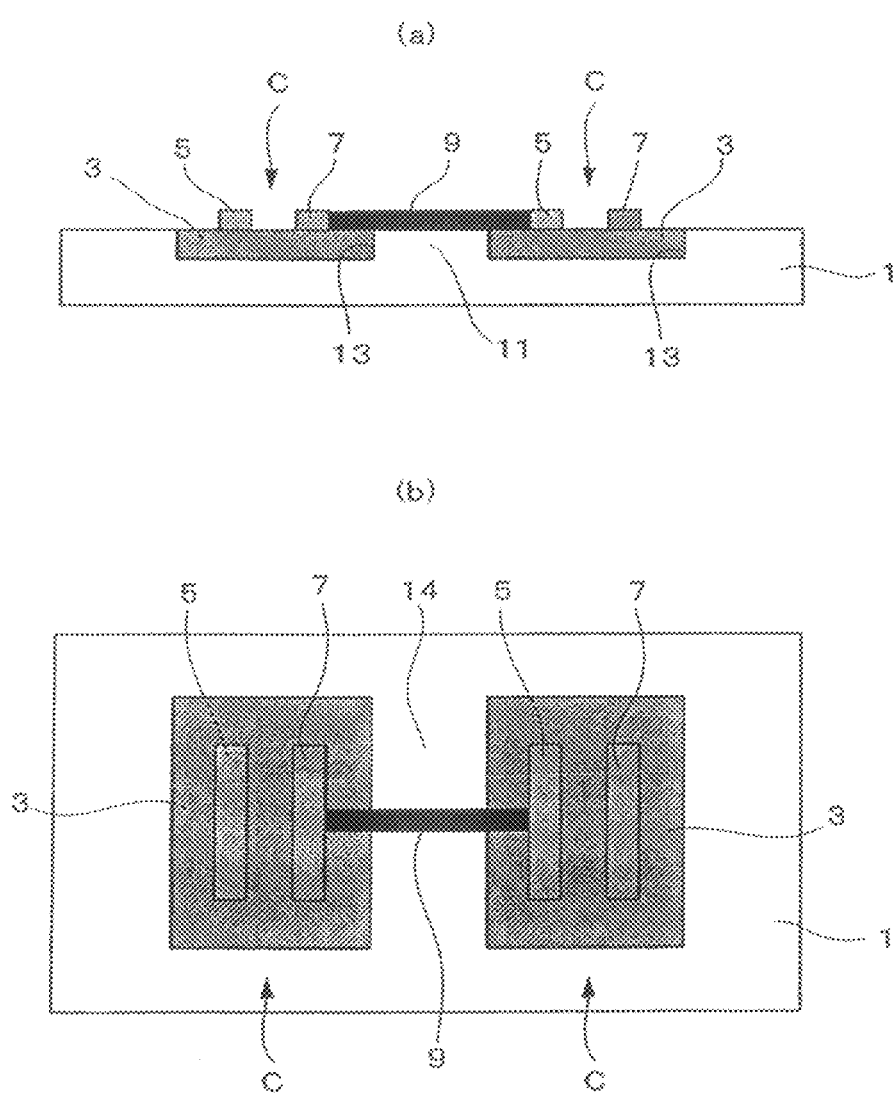
FIG. 14 shows another example of the fuel cell of FIG. 6, wherein (a) is a cross-sectional view and (b) is a schematic plan view.

In the third embodiment, the electrolyte 3 is formed on the substrate 1; however, it is also possible to employ the following arrangement. As shown in FIG. 14, two concave portions 11, which are rectangular as seen in plan view, are formed in one surface of the substrate 1, and the electrolyte 3 of a single cell C is placed in each concave portion 11. In this arrangement, each electrolyte 3 is separated from each other by a wall 14 between the concave portions 13. The depth of each concave portion is preferably 5 μm to 5 mm. If the depth is less than 5 μm, it is difficult to dispose the electrolyte 3 in such a manner that the electrolyte 3 does not overflow the concave portion 13. If the depth thereof is greater than 5 mm, the portion that does not contribute to cell reaction in the electrolyte 3 increases, which increases production costs.

In this fuel cell, because the electrolyte 3 of each single cell C is disposed in a concave portion 13 in the substrate 1, electrolytes 3 are separated from each other by walls 11 formed between the concave portions 13. Because the electrolytes 3 are not connected to each other between the adjacent single cells C, it is possible to prevent reduction of open circuit voltage caused by the electrolyte between adjacent electrodes functioning, as observed in conventional techniques, as a path through which oxygen ions migrate. As a result, high output can be obtained.

Note that the figures show that the interconnectors in some of the above embodiments are attached to side surfaces of the electrodes; however, it is also possible to structure the interconnectors so that each end of the interconnector is placed on top of each electrode.

The present invention is explained in more detail below.

Example 1

Figure 15:
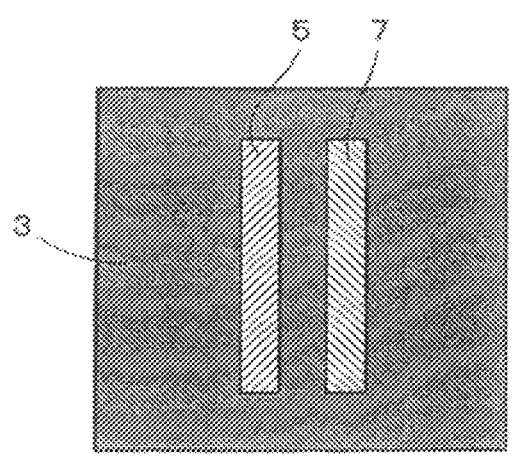
FIG. 15 shows a fuel cell of Example 1 of the present invention, wherein (a) is a plan view and (b) is a cross-sectional view.
Figure 15:
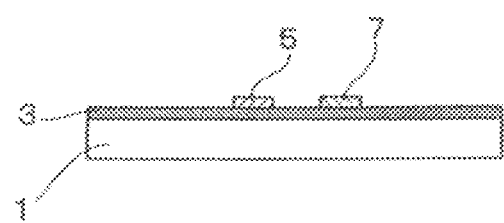

A solid oxide fuel cell as shown in FIG. 15 was manufactured. FIG. 15(a) is a plan view of the fuel cell of Example 1 and FIG. 15(b) is a cross-sectional view.

GDC ($Ce_{0.9}Gd_{0.1}O_{1.9}$) powder (particle diameter of 0.05 μm to 5 μm, average particle diameter of 0.5 μm) was used as an electrolyte material and mixed with cellulose-based binder resin to obtain an electrolyte paste (weight ratio of the electrolyte material:cellulose-based binder resin was 95:5). By diluting the paste using a solvent, the viscosity of the electrolyte paste was set to $5\times10^5$ mPa·s, as is desirable for screen printing.

Furthermore, anode paste was prepared as the anode material by mixing NiO powder (particle diameter of 0.01 to 10 μm, average particle diameter of 1 μm) and SDC ($Ce_{0.8}Sm_{0.2}O_{1.9}$) powder (particle diameter of 0.01 μm to 10 μm, average particle diameter of 0.1 μm) in such amounts that the weight ratio of NiO powder:SDC powder in the mixture was 7:3, and cellulose-based binder resin was added to the mixture in such an amount that the resultant anode paste comprised 80 wt. % of the mixture. In other words, the ratio of mixture:binder resin was 80:20. By diluting using a solvent, the viscosity of the anode paste was set to $5\times10^5$ mPa·s, as is desirable for screen printing.

Cathode paste was prepared as the material for the cathode by mixing SSC ($Sm_{0.5}, Sr_{0.5}, CoO_3$) powder (particle diameter of 0.1 μm to 10 μm, average particle diameter of 1 μm) with cellulose-based binder resin in such amounts that the cathode paste comprised 80 wt. % of the SSC powder. In other words, the weight ratio of SSC power:binder resin in the resultant cathode paste was 80:20. As with the anode, by diluting using a solvent, the viscosity of the cathode paste was set to $5\times10^5$ mPa·s, as is desirable for screen printing. The substrate 1 was made of an alumina-based substrate 10 mm square with a thickness of 1 mm.

The electrolyte paste was applied onto the substrate 1 by screen printing to 10 mm square area, dried at 130° C. for 15 minutes, and sintered at 1500° C. for 10 hours, obtaining an electrolyte 3 having a thickness after sintering of 200 μm.

The anode paste was applied so as to have a width of 500 μm and a length of 7 mm by screen printing. The paste was dried at 130° C. for 15 minutes and sintered at 1450° C. for one hour, obtaining an anode 5 having a thickness after sintering of 30 μm. Subsequently, the cathode paste was applied by screen printing on the same surface of the electrolyte 3 to which the anode paste had been applied. The cathode paste was applied so as to have a width of 500 μm, length of 7 mm, and distance from the anode of 500 μm. As with the anode, the cathode paste was dried at 130° C. for 15 minutes and sintered at 1200° C. for one hour, thus forming a cathode 7 having a thickness after sintering of 30 μm, accordingly, obtaining a solid oxide fuel cell comprising a single electrode element.

The thus-produced solid oxide fuel cell of Example 1 was subjected to the following evaluation test. Specifically, a mixture gas of methane and oxygen was introduced to the fuel cell at 800° C., causing the reaction $CH_4+1/2O_2 \rightarrow 2H_2+CO$. The anode 5 comprising a nickel oxide was thus reduced, and the current/voltage characteristics thereof were then evaluated. It is also possible to introduce hydrogen gas instead of the above-described mixture gas to conduct reduction treatment.

As a result, it was confirmed that a solid oxide fuel cell that can obtain a maximum power density of 65 mW/cm² was produced in Example 1.

Example 2

Example 2 is explained below. Example 2 differs from Example 1 in that a stress relaxation layer lies between the electrolyte and the substrate. In Example 2, the stress relaxation layer paste was prepared by mixing GDC and $Al_2O_3$ powder (particle diameter of 0.1 to 10 μm, average particle diameter of 3 μm) in such a manner that the weight ratio of GDC:$Al_2O_3$ powder became 50:50. The stress relaxation layer paste was diluted by solvent so as to have a viscosity that is suitable for screen printing, i.e., about $5\times10^5$ mPa·s.

Detailed explanations of other materials are omitted as these were the same as in Example 1.

The production process is explained below. The stress relaxation layer paste was applied on the substrate so that the paste had an applied thickness of 30 μm, and dried at 130° C. for 15 minutes. Thereafter, the electrolyte, the anode, and the cathode were formed in that order in Example 1.

The thus-formed fuel cell had reduced cracking in the thin film electrolyte compared to a fuel cell without a stress relaxation layer. With regard to the cell performance, as in Example 1, the fuel cell of Example 2 obtained a maximum power density of 65 mW/cm².

Example 3

Figure 16:
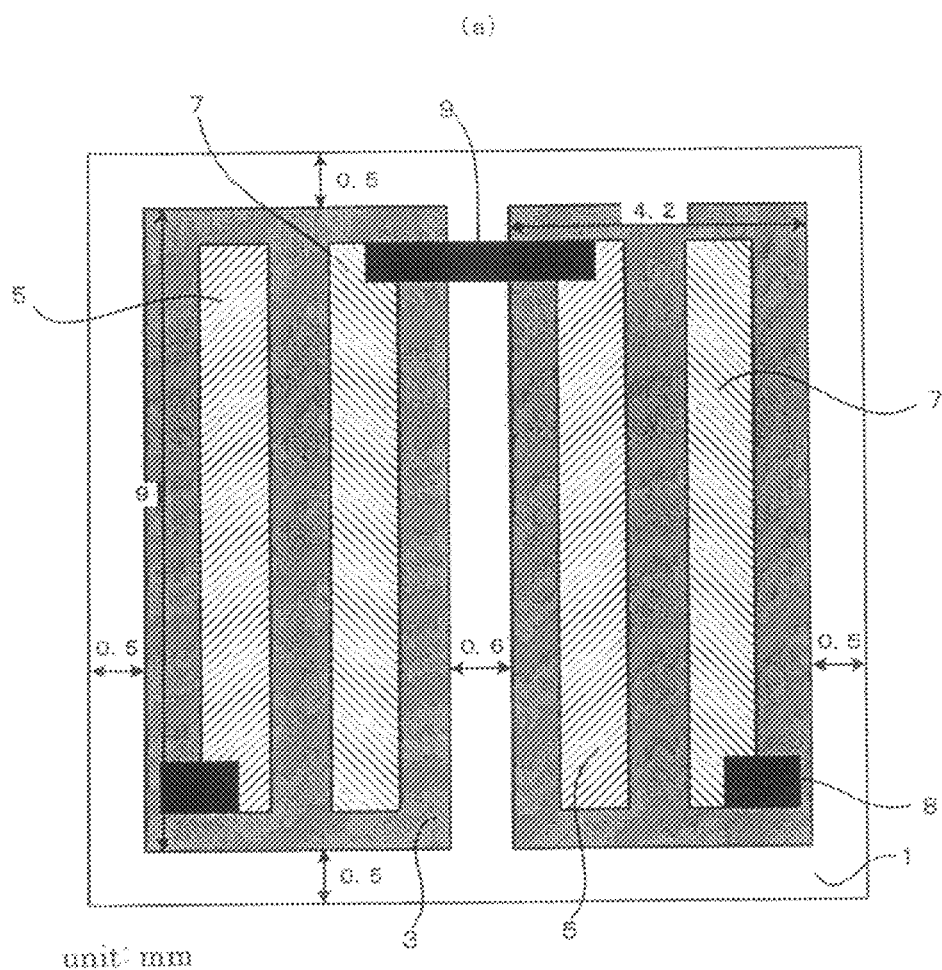
FIG. 16 shows a fuel cell of Example 3 of the present invention, wherein (a) is a plan view and (b) is a cross-sectional view.
Figure 16:
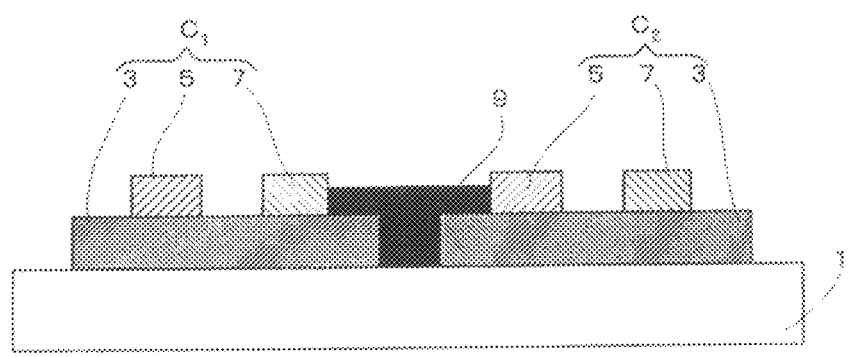

In Example 3, the solid oxide fuel cell shown in FIG. 16 was manufactured. The same materials for the substrate, electrolyte, and electrodes as in Example 1 were used. Au powder (particle diameter of 0.1 μm to 5 μm, average particle diameter of 2.5 μm) was used as the material for the current collector member and interconnector connecting single cells. Cellulose-based binder resin was added to the Au powder, preparing the interconnector paste and current collector member paste. The viscosity of the interconnector paste was set to $5\times10^5$ mPa·s, as is desirable for screen printing.

Subsequently, the electrolyte paste was applied on the substrate 1 by screen printing so that a plurality of rectangular electrolytes were formed. The electrolyte paste was patterned so that two rectangular electrolytes positioned 0.5 mm from the edge of the substrate and each having dimensions of 9×4.2 mm were placed with a distance of 0.6 mm therebetween. The electrolyte paste was dried at 130° C. for 15 minutes and sintered at 1500° C. for 10 hours, forming the electrolyte 3 having a thickness after sintering of 200 μm. Thereafter, the anode paste was applied to each electrolyte 3 by screen printing in such a manner that an anode 5 having a width of 500 μm, length of 7 mm, and applied thickness of 50 μm was formed on the electrolyte 3. The anode paste was dried at 130° C. for 15 minutes and sintered at 1450° C. for one hour, obtaining an anode having a thickness after sintering of 30 μm. Subsequently, the cathode paste was applied on the same surface of the electrolyte 3 to which the anode paste had been applied by screen printing in such a manner that a cathode 7 having a width of 500 μm, length of 7 mm, applied thickness of 50 μm, and a distance from the anode 5 of 500 μm was formed on each electrolyte 3. As with the anode 5, the cathode paste was then dried at 130° C. for 15 minutes and sintered at 1200° C. for one hour. Its thickness after sintering was 30 μm.

The interconnector paste was then applied by screen printing (width of 2 μm, thickness of 50 μm), the single cells C were connected in series as shown in FIG. 16, and current collector members 8 were formed on the electrodes of the cells at each end of the serial connection. The solid oxide fuel cell of Example 3 was thus obtained.

A fuel cell of Comparative Example 1, which is compared to that of Example 3, was manufactured in the following manner. In Comparative Example 1, a 10×10 mm electrolyte with a thickness of 1 mm was prepared and used as a substrate. Two each of anodes and cathodes having the same dimensions as those in Example 3 were formed on the electrolyte with the same distances therebetween as in Example 3 and connected in series using an interconnector. A fuel cell comprising a single cell was also prepared as Comparative Example 2.

The thus-obtained fuel cells of Example 3 and Comparative Example 1 were subjected to an evaluation test as described below. A mixed gas of methane and oxygen was introduced to the fuel cell at 800° C. to cause the reaction $CH_4 + 1/2O_2 \rightarrow 2H_2 + CO$ so that the anode 5 comprising nickel oxide was reduced. The current/voltage characteristics were then evaluated. Note that, to conduct reduction treatment, hydrogen gas may be introduced instead of the above-described mixed gas.

The results show that the open circuit voltage of the fuel cell of Comparative Example 2, which comprises a single cell, was 610 mV, and the open circuit voltage of the fuel cell of Example 3, which comprises two cells, was 1190 mV. The fuel cell of Comparative Example 1, which comprises two pairs of electrodes, had 900 mV of open circuit voltage. From these results, it was confirmed that the open circuit voltage in the fuel cell of Comparative Example 1 was not twice that of the fuel cell of Comparative Example 2, due to short circuiting occurring inside the cell. In contrast, in Example 3, because the electrolytes were placed with a predetermined distance therebetween, short circuit in the cell was reduced. Therefore, the fuel cell of Example 3 produced almost twice the open circuit voltage of the fuel cell of Comparative Example 2.

Example 4

Figure 17:
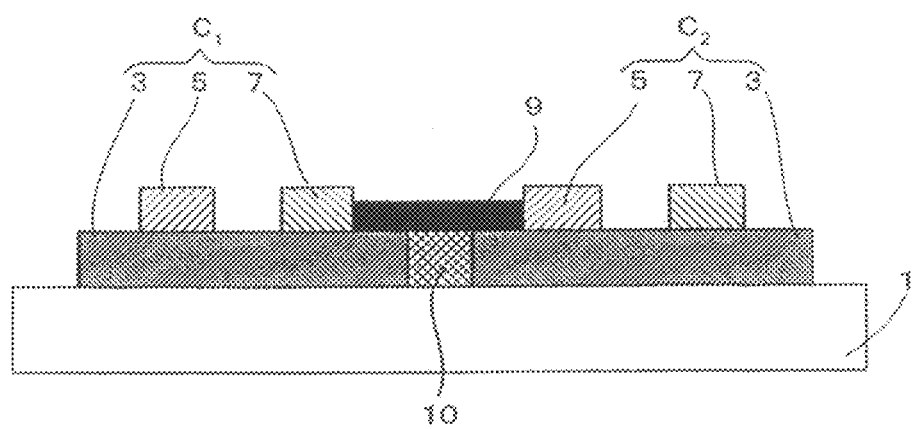
FIG. 17 is a cross-sectional view of a fuel cell of Example 4 of the present invention.

In Example 4, an insulating film was placed between each single cell in the fuel cell shown in FIG. 16. This arrangement allows adjacent electrolytes 3 to be separated from each other by the insulating film 10 as shown in FIG. 17, and therefore the single cells can be electrically separated from each other in a more reliable manner. Furthermore, this arrangement makes the connection of the interconnector 9 easier and more reliable. Accordingly, formation of a fuel cell between single cells can be reliably prevented, and therefore high electrical power output can be achieved.

In this case, it is preferable that the insulating film 10 be formed from a ceramic-based material. Examples of usable ceramic-based materials are alumina-based and silica-based ceramic materials. As with the electrolyte, the particle diameter of the ceramic material powder forming the insulating film 10 is generally 10 nm to 100 μm, and preferably 100 nm to 10 μm. The insulating film 10 is prepared using an above-mentioned ceramic material powder as a main ingredient while adding suitable amounts of binder resin, organic solvents, etc. As with the electrolyte, etc., the thickness of the insulating film after sintering is generally 1 μm to 500 μm and preferably 10 μm to 100 μm.

The same electrolyte paste, anode paste, cathode paste, and substrate as in Example 3 were prepared. Au powder (particle diameter of 0.1 μm to 5 μm, average particle diameter of 2.5 μm) was used as the material for the current collector member and the interconnector connecting each single cell. Interconnector paste and current collector member paste were prepared by adding cellulose-based binder resin to the Au powder. The viscosity of the interconnector paste was $5 \times 10^5$ mPa·s, which is desirable for screen printing. Insulating film paste for forming the insulating film was also prepared by adding cellulose-based binder resin to alumina powder (alumina particle diameter of 0.1 to 10 μm).

Subsequently, the insulating film paste was applied to the substrate 1 in the portion which will be between the electrolytes 3, sintered at 1800° C., thus forming the insulating film 10. Electrolyte 3, anodes 5, and cathodes 7 were formed in the same manner as in Example 3. Here, the electrolytes 3 were positioned so as to sandwich the insulating film paste therebetween. As in the Example 3, each single cell C was connected in series using the interconnector 9, and a current collector member 8 was then provided at each end electrode of the serial connection, thus forming the solid oxide fuel cell of Example 4.

The fuel cell of Example 4 was also evaluated by the same method as Example 4, and exhibited the same characteristics as in Example.

INDUSTRIAL APPLICABILITY

The present invention provides a solid oxide fuel cell, which alleviates vulnerability to damage, reduces production costs, and obtains high electrical power output.

The invention claimed is:

1. A solid oxide fuel cell comprising:
a substrate;
an electrolyte disposed on one surface of the substrate; and
a plurality of electrode elements, wherein each electrode element comprises an anode and a cathode disposed on the same surface of the electrolyte and on the opposite side of the electrolyte from the substrate with a predetermined space between the anode and cathode of each electrode element,
wherein a groove is formed in the electrolyte to partition between at least two adjacent electrode elements.

2. A solid oxide fuel cell comprising:
a substrate;
an electrolyte disposed on one surface of the substrate; and
a plurality of electrode elements, wherein each electrode element comprises an anode and a cathode disposed on the same surface of the electrolyte and on the opposite side of the electrolyte from the substrate with a predetermined space between the anode and cathode of each electrode element,
wherein the substrate is formed from a ceramic material.

* * * * *